United States Patent
Youmans

(10) Patent No.: US 9,862,102 B2
(45) Date of Patent: Jan. 9, 2018

(54) CYLINDRICAL WORM DRIVE ROBOTIC GRIPPER

(71) Applicant: X Development LLC, Mountain View, CA (US)

(72) Inventor: David Youmans, San Francisco, CA (US)

(73) Assignee: X Development LLC, Mountain View, CA (US)

(*) Notice: Subject to any disclaimer, the term of this patent is extended or adjusted under 35 U.S.C. 154(b) by 0 days.

(21) Appl. No.: 15/631,215

(22) Filed: Jun. 23, 2017

(65) Prior Publication Data

US 2017/0355082 A1    Dec. 14, 2017

Related U.S. Application Data

(63) Continuation of application No. 15/178,122, filed on Jun. 9, 2016, now Pat. No. 9,718,195.

(51) Int. Cl.
| | |
|---|---|
| *B25J 15/10* | (2006.01) |
| *B25J 15/02* | (2006.01) |
| *B25J 11/00* | (2006.01) |
| *B25J 15/00* | (2006.01) |

(52) U.S. Cl.
CPC ....... *B25J 15/0028* (2013.01); *B25J 11/0085* (2013.01); *B25J 15/0213* (2013.01)

(58) Field of Classification Search
CPC ...... B25J 15/0213; B25J 15/024; B25J 15/08; B25J 15/086; B25J 15/10; B25J 15/103; B25J 15/12; B25J 11/0085; Y10S 901/38; Y10S 901/29; A61F 2/586

USPC .......................................................... 294/106
See application file for complete search history.

(56) References Cited

U.S. PATENT DOCUMENTS

| | | |
|---|---|---|
| 3,202,449 A | 8/1965 | Lemelson |
| 4,114,464 A | 9/1978 | Schubert et al. |
| 4,149,278 A | 4/1979 | Frosch et al. |
| 4,600,357 A | 7/1986 | Coules |
| 8,251,420 B2 | 8/2012 | Mizuno et al. |
| 8,414,043 B2 | 4/2013 | Albin et al. |
| 8,534,729 B2 | 9/2013 | Wilkinson et al. |
| 9,718,195 B1 * | 8/2017 | Youmans ............... B25J 15/12 |
| 2015/0151433 A1 | 6/2015 | Rust et al. |

* cited by examiner

*Primary Examiner* — Dean Kramer
(74) *Attorney, Agent, or Firm* — McDonnell Boehnen Hulbert & Berghoff LLP

(57) ABSTRACT

An example robotic gripping apparatus includes a robotic wrist and a motor contained within the robotic wrist. The motor includes a drive shaft that rotates about a primary axis during motor operation. The robotic gripping apparatus also includes a cylindrical worm gear, connected to the drive shaft, that encircles the motor and rotates about the primary axis during motor operation. Additionally, the robotic gripping apparatus includes two or more robotic fingers, each having a proximal end and a distal end. The robotic gripping apparatus further includes two or more spur gears corresponding to the two or more robotic fingers. Each spur gear is attached to the proximal end of the corresponding robotic finger. Each spur gear engages the cylindrical worm gear and rotates the corresponding robotic finger when the cylindrical worm gear rotates about the primary axis.

20 Claims, 13 Drawing Sheets

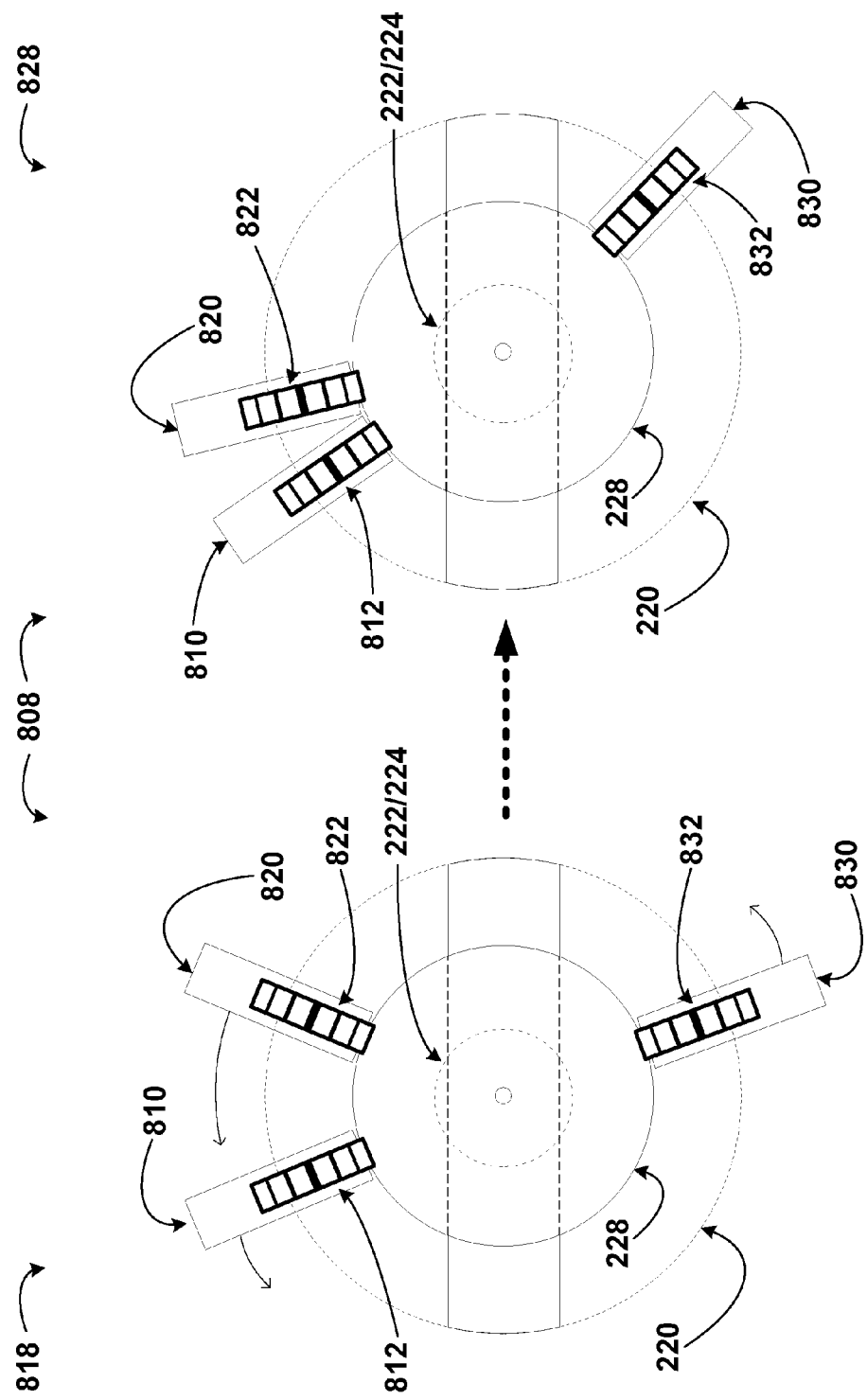

CYLINDRICAL WORM DRIVE ROBOTIC GRIPPER

CROSS REFERENCE TO RELATED APPLICATIONS

The present application claims priority to U.S. patent application Ser. No. 15/178,122 filed on Jun. 9, 2016 and entitled "Cylindrical Worm Drive Robotic Gripper," which is herein incorporated by reference as if fully set forth in this description.

BACKGROUND

As technology advances, various types of robotic devices are being created for performing a variety of functions that may assist users. Robotic devices may be used for applications involving material handling, transportation, welding, assembly, and dispensing, among others. Over time, the manner in which these robotic systems operate is becoming more intelligent, efficient, and intuitive. As robotic systems become increasingly prevalent in numerous aspects of modern life, it is desirable for robotic systems to be efficient. Therefore, a demand for efficient robotic systems has helped open up a field of innovation in actuators, movement, sensing techniques, as well as component design and assembly.

Robotic devices, such as robotic legs and arms, may include various components or attachments that are designed to interact with the environment. Such components may include robotic feet and hands, which may include additional components that can be used to support, stabilize, grip, and otherwise allow a robotic device to effectively carry out one or more actions. In particular, robotic arms may include one or more "grippers" that interact with the environment.

SUMMARY

Example systems and methods may allow for a compact robotic gripper. Two or more robotic fingers of the robotic gripper may be positioned about the circumference of a robotic wrist of the robotic gripper. Each of the robotic fingers may have a spur gear attached to the robotic finger to rotate the robotic finger. The spur gears of each of the robotic fingers may be positioned around and driven by a cylindrical worm gear within the robotic wrist. The cylindrical worm gear may encircle a motor and/or a gearbox used to drive the cylindrical worm gear. A drive shaft of the motor may be tied to the cylindrical worm gear; enabling the motor to drive the cylindrical worm gear. The drive shaft and the cylindrical worm gear may both rotate about a common primary axis during operation of the robotic gripper.

In one aspect, a robotic gripping apparatus is provided. The robotic gripping apparatus includes a robotic wrist. The robotic gripping apparatus also includes a motor contained within the robotic wrist. The motor includes a drive shaft that is configured to rotate about a primary axis during motor operation. The robotic gripping apparatus further includes a cylindrical worm gear, connected to the drive shaft. The cylindrical worm gear encircles the motor and is configured to rotate about the primary axis during motor operation. The robotic gripping apparatus additionally includes two or more robotic fingers, each having a proximal end and a distal end. Further, the robotic gripping apparatus includes two or more spur gears corresponding to the two or more robotic fingers, each spur gear attached to the proximal end of the corresponding robotic finger. Each spur gear engages the cylindrical worm gear and is configured to rotate the corresponding robotic finger about a respective axis when the cylindrical worm gear rotates about the primary axis.

In another aspect, a method is provided. The method includes driving, by a motor contained within a robotic wrist, a drive shaft that rotates about a primary axis. The method also includes rotating, by the drive shaft, a cylindrical worm gear. The cylindrical worm gear encircles the motor and rotates about the primary axis. Additionally, the method includes rotating, by the cylindrical worm gear, two or more spur gears, corresponding to two or more robotic fingers, about two or more respective axes. Each of the robotic fingers has a proximal end and a distal end. Each spur gear is attached to the proximal end of the corresponding robotic finger. The method further includes rotating, by the two or more spur gears, the two or more corresponding robotic fingers about the two or more respective axes.

In yet another aspect, a robot comprising a robotic gripping apparatus is provided. The robotic gripping apparatus includes a robotic wrist. The robotic gripping apparatus also includes a motor contained within the robotic wrist. The motor includes a drive shaft that is configured to rotate about a primary axis during motor operation. The robotic gripping apparatus additionally includes a cylindrical worm gear, connected to the drive shaft. The cylindrical worm gear encircles the motor and is configured to rotate about the primary axis during motor operation. Further, the robotic gripping apparatus includes two or more robotic fingers, each having a proximal end and a distal end. The robotic gripping apparatus further includes two or more spur gears corresponding to the two or more robotic fingers, each spur gear attached to the proximal end of the corresponding robotic finger. Each spur gear engages the cylindrical worm gear and is configured to rotate the corresponding robotic finger about a respective axis when the cylindrical worm gear rotates about the primary axis.

These as well as other aspects, advantages, and alternatives will become apparent to those of ordinary skill in the art by reading the following detailed description, with reference, where appropriate, to the accompanying drawings.

BRIEF DESCRIPTION OF THE DRAWINGS

FIGS. 8A and 8B are top-view illustrations of another robotic gripping apparatus in two conformations, according to example embodiments.

DETAILED DESCRIPTION

Figure 1:
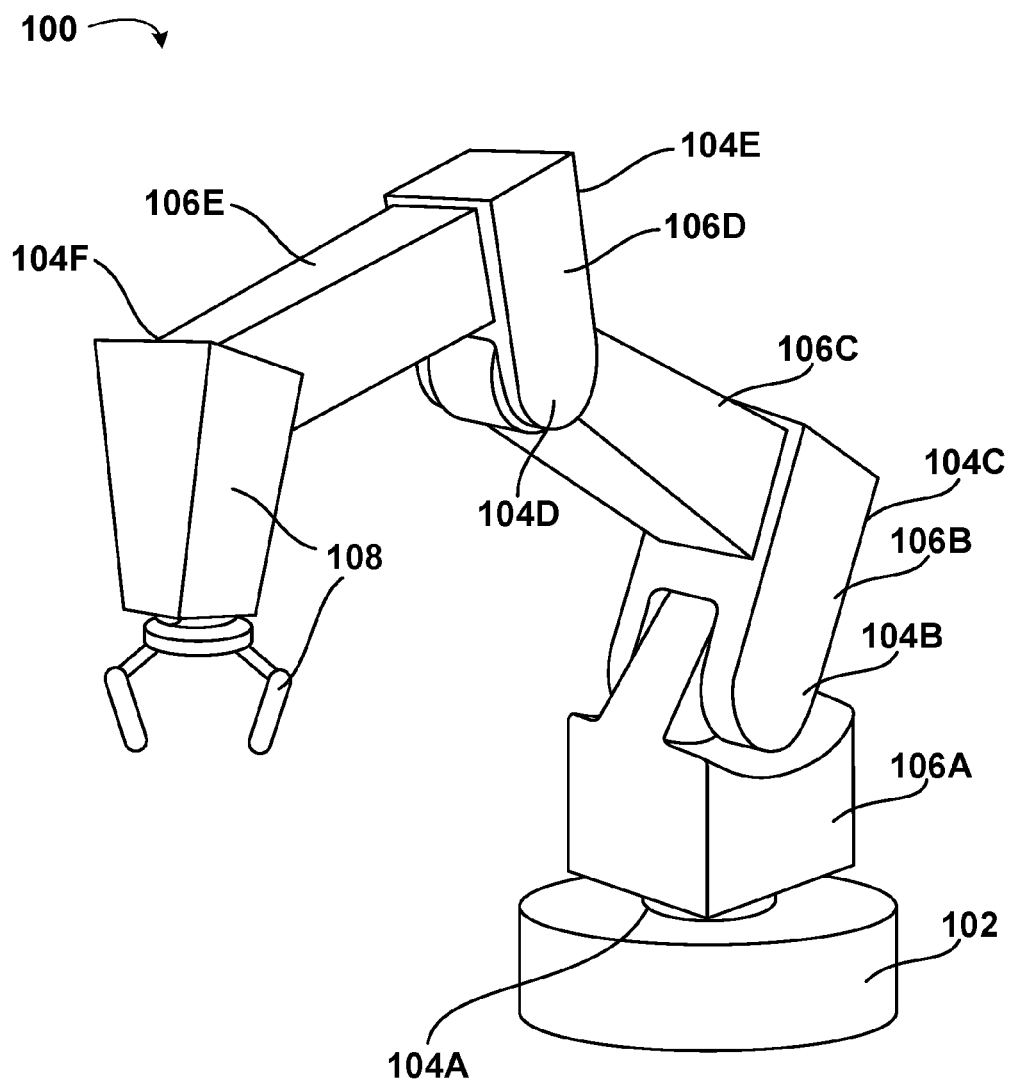
FIG. 1 is an illustration of a robotic arm, according to example embodiments.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments might include more or less of each element shown in a given Figure. Further, some of the illustrated elements may be combined or omitted. Yet further, an example embodiment may include elements that are not illustrated in the Figures.

I. Overview

In some embodiments, robots may include robotic grippers. Such robotic grippers may be configured to interact with a robot's environment. For example, robotic grippers may include two or more robotic fingers capable of grasping an object. Additionally, such robotic fingers may require actuation in order to open and close their grasp. This actuation may be provided by actuators (e.g., motors equipped with gears). The actuators may be housed within a robotic wrist of the robot.

Reducing the space occupied by such actuators can enhance the capabilities of the robot. For example, if the space occupied by a motor and gearbox used to drive one or more of the robotic fingers were more compact, the overall volume of the robotic wrist could be reduced (e.g., the width and/or the length of the robotic wrist could be decreased). If the volume of the robotic wrist were reduced, the length between the robotic gripper and a robotic elbow/shoulder of a robotic arm of the robot could also be reduced. This reduction in length may increase the dexterity of the robotic arm/gripper. Additionally, a reduction in length may reduce the amount of applied torque necessary from other actuators of the robotic arm that are upstream of the robotic wrist (e.g., an elbow joint actuator or a shoulder joint actuator). Reducing the amount of applied torque required may allow for smaller actuators within such components and/or reduce the amount of energy consumed by the robot.

Example systems and methods are provided that use a cylindrically shaped worm gear to compact the actuation space required for a robotic gripper. In some embodiments, this includes reducing the required volume of the robotic wrist, which may reduce the minimum size of the robotic gripper. Additionally, the cylindrically shaped worm gear may provide the robotic gripper with the ability to have a varied number of robotic fingers, a varied location of robotic fingers, or the ability to reposition robotic fingers, depending on the tasks to be performed by the robotic gripper.

In one example embodiment, a robotic gripper is provided. The robotic gripper may include a robotic wrist, a motor, a cylindrical worm gear, two or more robotic fingers, and two or more spur gears. The robotic wrist may house the motor and the cylindrical worm gear. Further, the cylindrical worm gear may be driven by the motor (e.g., by being linked to a drive shaft of the motor). The cylindrical worm gear may encircle the motor and rotate about the same axis as the motor drive shaft. For example, the cylindrical worm gear may be built into the housing of the motor itself (e.g., in a fashion similar to an outrunner style motor). This could further compact the cylindrical worm gear design within the robotic wrist.

The cylindrical worm gear may engage the two or more spur gears. Additionally, when the motor is driven, the two or more spur gears engaging the cylindrical worm gear may rotate, each about a respective axis. The two or more spur gears may also be housed inside the robotic wrist. In addition, each of the spur gears may be attached to one of the robotic fingers (e.g., at a proximal end of the respective robotic finger; the proximal end located nearer the robotic wrist than a distal end of the respective robotic finger). Thus, when the spur gear rotates as the spur gear is driven by the motor/cylindrical worm gear, the corresponding robotic finger may also rotate about the same respective axis.

The rotation of the two or more fingers may occur in opposing directions (i.e., the two or more fingers may act to close or open a respective grasp of the robotic gripping apparatus). This action may allow the two or more fingers to grip or release an object within the environment of the robot.

II. Example Embodiments

Referring now to the figures, FIG. 1 shows an example robotic arm 100. As shown, the robotic arm 100 includes a base 102, which may be a stationary base or may be a movable base. In the case of a movable base, the base 102 may include wheels (not shown), powered by one or more actuators, which allow for mobility of the entire robotic arm 100.

Additionally, the robotic arm 100 includes joints 104A-104F, each of which may be coupled to one or more actuators. The actuators in joints 104A-104F may operate to cause movement of various movable components such as appendages 106A-106E and/or gripping apparatus 108. For example, the actuator in joint 104F may cause movement of gripping apparatus 108.

Further, gripping apparatus 108 may take on various forms and may include various parts. In some example embodiments, gripping apparatus 108 may take the form of a gripper similar to the robotic gripping apparatus illustrated in FIG. 2. In example embodiments, gripping apparatus 108 may include sensors such as force sensors, location sensors, and/or proximity sensors. Other examples may also be possible.

Gripping apparatus 108 may include a robotic wrist, as illustrated in FIG. 1. Additional actuators may be disposed inside of the robotic wrist, as illustrated in later figures, that serve to alter the conformation of the gripping apparatus 108 (e.g., close and open the grasp of gripping apparatus 108 by closing or opening robotic fingers of gripping apparatus 108). Additionally, gripping apparatus 108 may be capable of rotating to reorient gripping apparatus 108. Such a rotation may be performed at joint 104F.

Figure 2:
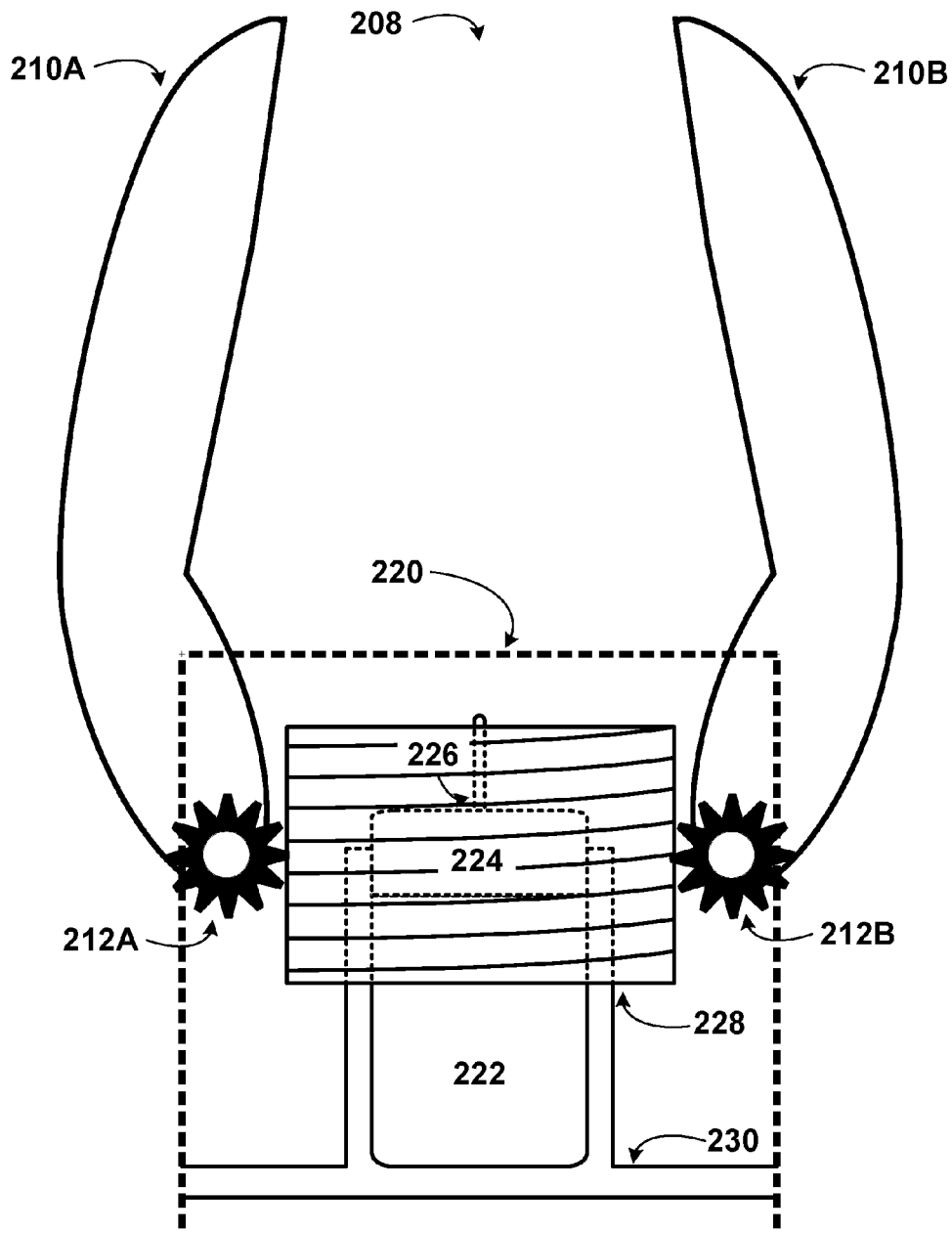
FIG. 2 is a side-view illustration of a robotic gripping apparatus, according to example embodiments.

FIG. 2 is a side-view illustration of a robotic gripping apparatus 208, according to example embodiments. The robotic gripping apparatus 208 may correspond to the gripping apparatus 108 illustrated in FIG. 1. The robotic gripping apparatus 208 may include two or more robotic fingers 210A-B, corresponding spur gears 212A-B for each of the robotic fingers 210A-B, a robotic wrist 220, a motor 222 housed in the robotic wrist 220, a gearbox 224 housed in the robotic wrist 220, a drive shaft 226 housed in the robotic wrist 220, a cylindrical worm gear 228 housed in the robotic wrist 220, and a mounting bracket 230 housed in the robotic wrist 220.

The robotic fingers 210A-B may be elongated devices designed to applied force to an object, in order to grip the object. For example, the robotic fingers 210A-B may cooperatively grasp objects within the environment of the robotic gripping apparatus 208. As illustrated in the example embodiment of FIG. 2, the robotic gripping apparatus 208 may include two robotic fingers 210A-B. In alternate embodiments, such as those later described in the disclosure, the robotic gripping apparatus may include more than two robotic fingers (e.g., three robotic fingers or more). More than two robotic fingers may provide the robotic gripping apparatus with the ability to create an enveloping grasp on an object.

In various embodiments, the robotic fingers may have various shapes. For example, the robotic fingers may be long and slender, thus suited for tasks that require high pressure at very concentrated points on the tip of the robotic fingers (e.g., tweezers). Alternatively, the robotic fingers may be shaped more like paddles. Furthermore, unlike the robotic fingers 210A-B illustrated in FIG. 2, the robotic fingers may be a different shape and/or size than one another.

Additionally or alternatively, the robotic fingers 210A-B may have components/devices attached to them. For example, one or more of the robotic fingers 210A-B may have pressure sensors mounted to the tips of the robotic finger 210A-B. The pressure sensors may provide a pressure reading that indicates how much pressure is being applied by the robotic fingers 210A-B at a given time. This pressure reading may be provided to a control system within the robot. As another example, the robotic fingers 210A-B may have adhesive applied on the inner portion of the fingers, enhancing the ability of the robotic fingers 210A-B to pick up certain types of objects.

Depending on the embodiment, the spur gears 212A-B may be fabricated of metal, plastic, or other materials. The spur gears 212A-B may consist of gear teeth projected radially outward from a cylinder. The edge of each gear tooth may be parallel to axis of rotation of the respective spur gear 212A-B. Various designs are possible for the spur gears 212A-B.

The spur gears 212A-B corresponding to each of the robotic fingers 210A-B may engage the robotic fingers 210A-B with the cylindrical worm gear 228. As illustrated in FIG. 2, the spur gears 212A-B may be located near a proximal end of the robotic fingers 210A-B (i.e., an end of the robotic fingers 210A-B disposed nearer to the robotic wrist 220 than a distal end). The spur gears 212A-B may be connected to the robotic fingers 210A-B, thus allowing the spur gears 212A-B and the robotic fingers 210A-B to jointly rotate. In some embodiments, the spur gears 212A-B may be fastened to the robotic fingers 210A-B using screws or bolts. In alternate embodiments, the spur gears 212A-B may be adhered to the robotic fingers 210A-B using glue. In still other embodiments, the spur gears 212A-B may be embedded into the robotic fingers 210A-B themselves (e.g., a portion of the robotic fingers 210A-B may be cut away at a proximal end to define the teeth of the spur gears 212A-B, or the teeth of the spur gears 212A-B may be defined by an injection mold used to fabricate the robotic fingers 210A-B).

The spur gears 212A-B each rotate about a respective axis. This respective axis also defines the axis about which the corresponding robotic fingers 210A-B rotate. The gear pitch of the spur gears 212A-B may be defined such that the spur gears 212A-B can engage the cylindrical worm gear 228. Furthermore, the radius of the spur gears 212A-B may vary from one spur gear 212A-B to another. This may allow one of the robotic fingers 210A-B to open and close less quickly with respect to another when engaged at the same time by the cylindrical worm gear 228.

The robotic wrist 220 houses the motor 222, the gearbox 224, the drive shaft 226, the cylindrical worm gear 228, and the mounting bracket 230 in the embodiment illustrated in FIG. 2. The robotic wrist 220 may additionally house a portion of the robotic fingers 210A-B and all or a portion of the corresponding spur gears 212A-B. The robotic wrist 220, illustrated here by a dashed line, may be located at a distal end of a robotic arm 100, as illustrated in FIG. 1. In some embodiments, the robotic wrist 220 may be shaped like a trapezoidal prism, as in FIG. 1. Alternatively, the robotic wrist 220 may be cylindrical. Alternate three-dimensional shapes for the robotic wrist 220 are also possible. The robotic wrist 220 may include additional actuators or sensors in various embodiments. For example, the robotic wrist 220 may also include a rotational motor (e.g., servomotor) configured to provide the robotic wrist 220 with a rotational degree of freedom with respect to the robotic arm 100.

The motor 222 is configured to provide rotation to the drive shaft 226 when operating, thereby providing rotational power to the robotic fingers 210A-B through the cylindrical worm gear 228 and the spur gears 212A-B (the portion of the motor 222, and any other component for that matter, illustrated by a dashed line indicates the portion of the motor 222 that may be located inside of the cylindrical worm gear 228, and thus hidden from view). Thus, the motor 222 is configured to drive in a forward direction to close a grasp formed by the robotic fingers 210A-B, and the motor 222 is further configured to drive in a backward direction to open the grasp formed by the robotic fingers 210A-B.

In some embodiments, the motor 222 may be a brushless direct current (DC) electric motor. The motor 222 may additionally be controlled by a control system. For example, a microcontroller mounted on a circuit board and electrically connected to the input leads of the motor 222 may electrically engage and/or disengage the motor 222.

The gearbox 224 may increase the torque transmitted by the motor 222 to the drive shaft 226, and thus, ultimately, the torque transmitted to the robotic fingers 210A-B. This may further increase the strength with which the robotic gripping apparatus 208 grasps objects. Various different types of gears may be used within the gearbox 224. For example, the gearbox 224 may include epicyclic gears. Ball bearings may also be used in the gearbox 224.

The drive shaft 226 may be the component of the robotic gripping apparatus 208 that links the motor 222 to the cylindrical worm gear 228. The drive shaft 226 may, in some embodiments, be a drive shaft that is directly connected to the motor 228 drive (e.g., a rotor). Alternatively, the drive shaft 226 may be a second shaft that extends from the gearbox 224 and is modified in rotational speed by the gearing provided by the gearbox 224 (as in the embodiment of FIG. 2). Further, the drive shaft 226 may rotate about a primary axis. The primary axis may be the same axis about which a rotor of the motor 222 and/or the cylindrical worm gear 228 rotate.

The cylindrical worm gear 228 may be a gear that is connected to the motor 222 (either directly or indirectly) or an integral part of the motor 222 itself (e.g., the magnet housing of a brushless DC motor). The cylindrical worm gear 228 is a cylindrically shaped device that transfers rotational motion generated by the motor 222 to other components of the robotic gripping apparatus 108 (e.g., the robotic fingers 210A-B and the spur gears 212A-B). The cylindrical worm gear 228 may have teeth wrapping around the outer portion that cause the cylindrical worm gear 228 resemble a screw. The cylindrical worm gear 228 may act to convert the rotational motion of the motor 222 to linear motion at the teeth of the cylindrical worm gear 228.

The cylindrical worm gear 228 may encircle the motor 222 and/or the gearbox 224. In other words, the cylindrical worm gear 228 may surround the motor 222 and/or the gearbox 224. For example, when the motor 222 is in operation, the cylindrical worm gear 228 may rotate around the motor 222 and/or the gearbox 224. The cylindrical worm gear 228 may be directly connected with the drive shaft 226, in some embodiments, and further, may rotate about the same axis as the drive shaft 226. Furthermore, the spacing of the teeth on the cylindrical worm gear 228 may be such that the spur gears 212A-B can engage the cylindrical worm gear 228.

The cylindrical worm gear 228 may provide multiple benefits to the robotic gripping apparatus 208. For example, worm gears inherently provide a substantial gearing ratio in a compact area. This allows the robotic gripping apparatus 208 to grasp objects rigidly and with high force using the robotic fingers 210A-B (i.e., because of the substantial gearing ratio of the cylindrical worm gear 228, a significant amount of force may be required to backdrive the cylindrical worm gear 228). Because of the high gear ratio of the cylindrical worm gear 222 to the spur gears 212A-B, a less powerful motor may be used to drive the cylindrical worm gear 228 as compared with a motor used to drive the robotic fingers in other styles of robotic grippers.

The shape of the cylindrical worm gear 228 is inherently compact. Because the cylindrical worm gear 228 is shaped like a cylinder, the motor 222 and the gear box 224 can be disposed partially or wholly inside of the cylindrical worm gear 228. This can save volumetric space within the robotic wrist 220. This may permit the overall size of the robotic wrist 220 to decrease with respect to other robotic gripper designs.

Still further, the cylindrical worm gear 228, when viewed from above (as in FIG. 3), may be shaped as a circle. Given the circular shape of the cylindrical worm gear 228, space is provided about the circumference of the cylindrical worm gear 228 such that a plurality of robotic fingers 210A-B may be disposed about the cylindrical worm gear 228 (e.g., 6 robotic fingers or 8 robotic fingers). This may permit a greater number of robotic fingers 210A-B on the robotic gripping apparatus 210 than other robotic gripper designs. A large number of robotic fingers 210A-B, like six for example, may permit the robotic gripping apparatus 208 to grasp round objects (e.g., a basketball). Higher numbers of robotic fingers 210A-B may also help the robotic gripping apparatus 208 grasp objects with complex geometries using multiple fingers that interact with various features on an object's surface.

The cylindrical worm gear 228 may, in some embodiments, be fabricated of a plastic or a metal material. The cylindrical worm gear 228 may be rigid enough to support the force of the spur gears 212A-B being driven when the motor 222 is engaged without losing structural integrity (e.g., bending or cracking). For example, machined steel or aluminum may be used in the construction of the cylindrical worm gear 228. Further, the cylindrical worm gear 228 may be fabricated into the motor 222, itself. For example, the cylindrical worm gear 228 may be built into the shell of the motor 222, if the motor 222 is an outrunner style motor.

The mounting bracket 230 may allow the motor 222 to be mounted to a portion of the robotic wrist 220, as illustrated in FIG. 2. As illustrated, the mounting bracket 230 may run in between the motor 222 and the cylindrical worm gear 228. Such a design may permit a larger mounting area between the mounting bracket 230 and the motor 222 which may permit increased stability during motor 222 operation. In alternate embodiments, the mounting bracket 230 may be connected solely to the back of the motor 222. Many mounting bracket 230 designs are possible. Furthermore, the gearbox 224 may also be mounted to the robotic wrist 220 using the mounting bracket 230. This may provide increased stability for the gearbox 224 during motor 222 operation. The motor 222 and/or the gearbox 224 may be connected to the mounting bracket 230 using an adhesive, or fastened together, using screws.

In some embodiments, the robotic gripping apparatus 208 could further include a load cell placed between the cylindrical worm gear 228 and the drive shaft 226. Such a load cell could be capable of sensing a total force applied on the cylindrical worm gear 228 at the spur gears 212A-B. This may allow the robotic gripping apparatus 208 to monitor the total force being applied to an object at tips of the robotic fingers 210A-B.

Figure 3:
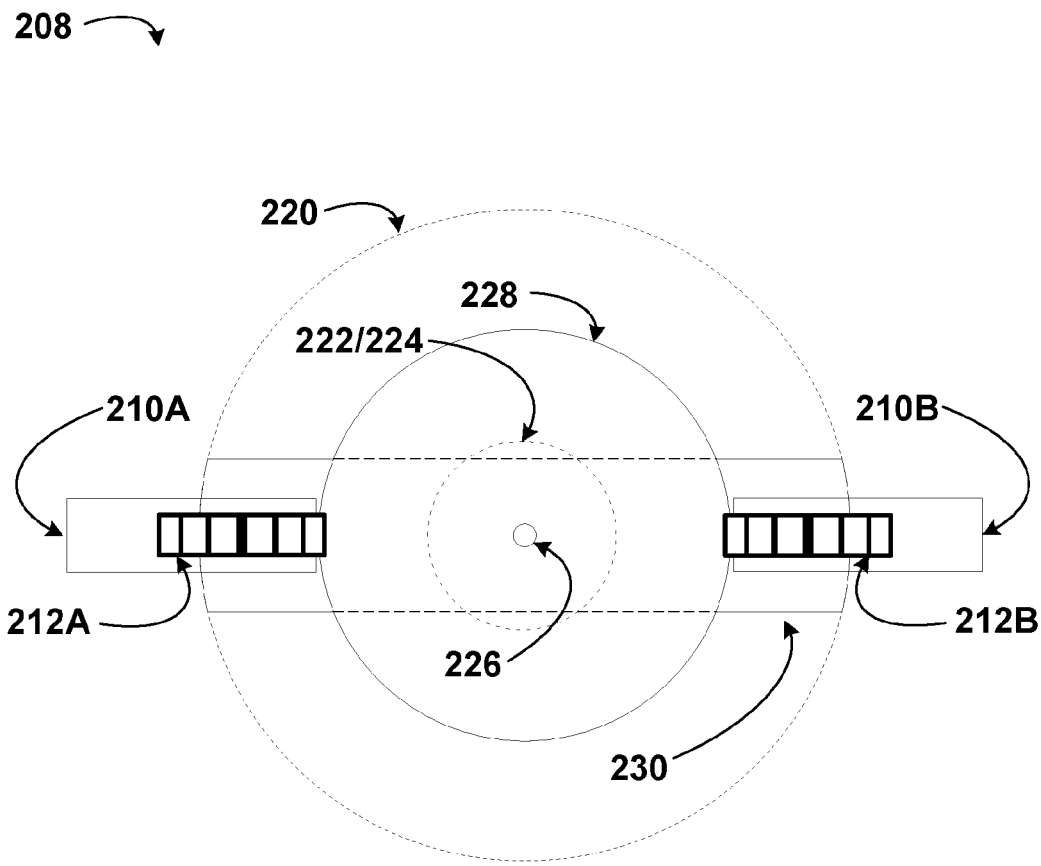
FIG. 3 is a top-view illustration of a robotic gripping apparatus, according to example embodiments.

FIG. 3 is a top-view illustration of the robotic gripping apparatus 208, according to example embodiments. In FIG. 3, a portion of the mounting bracket 230 and the entirety of the motor 222/the gearbox 224 are illustrated using dashed lines in this embodiment to illustrate the fact that they are hidden from view as they are located underneath the top, closed end of the cylindrical worm gear 228. As illustrated and previously discussed, the cylindrical worm gear 228 and the drive shaft 226 rotate about the same primary axis. Furthermore, as illustrated in FIG. 3, this primary axis may also be the axis about which the rotor of the motor 222 rotates. In alternate embodiments, the axis of rotation of the cylindrical worm gear 228 may be offset from the axis of rotation of the motor shaft. Also shown in FIG. 3, the cylindrical worm gear 228 may engage the two respective spur gears 212A-B of the robotic fingers 210A-B. As shown, the rotational axes of the respective spur gears 212A-B/corresponding robotic fingers 210A-B are perpendicular to the primary axis of rotation of the cylindrical worm gear 228 and the drive shaft 226.

As previously described, the cylindrical worm gear 228 illustrated in FIGS. 2 and 3 may not be backdriveable given a reasonably expected amount of force applied at the tips of the robotic fingers 210A-B. Ability to backdrive the fingers may be a product requirement for safety or for needed function during robot power off. For instance, if the robotic fingers 210A-B closed onto a person and the robotic gripping apparatus 208 powered down, it would be required that the robotic fingers 210A-B can be opened to free the person. Or, if the robotic fingers 210A-B grasp and object and the robotic gripping apparatus 208 powers down, it may be required that the object can be freed. An alternative embodiment is presented in FIG. 4 that may allow for backdriveability while still maintaining the high ratio of the cylindrical worm gear 228.

Figure 4:
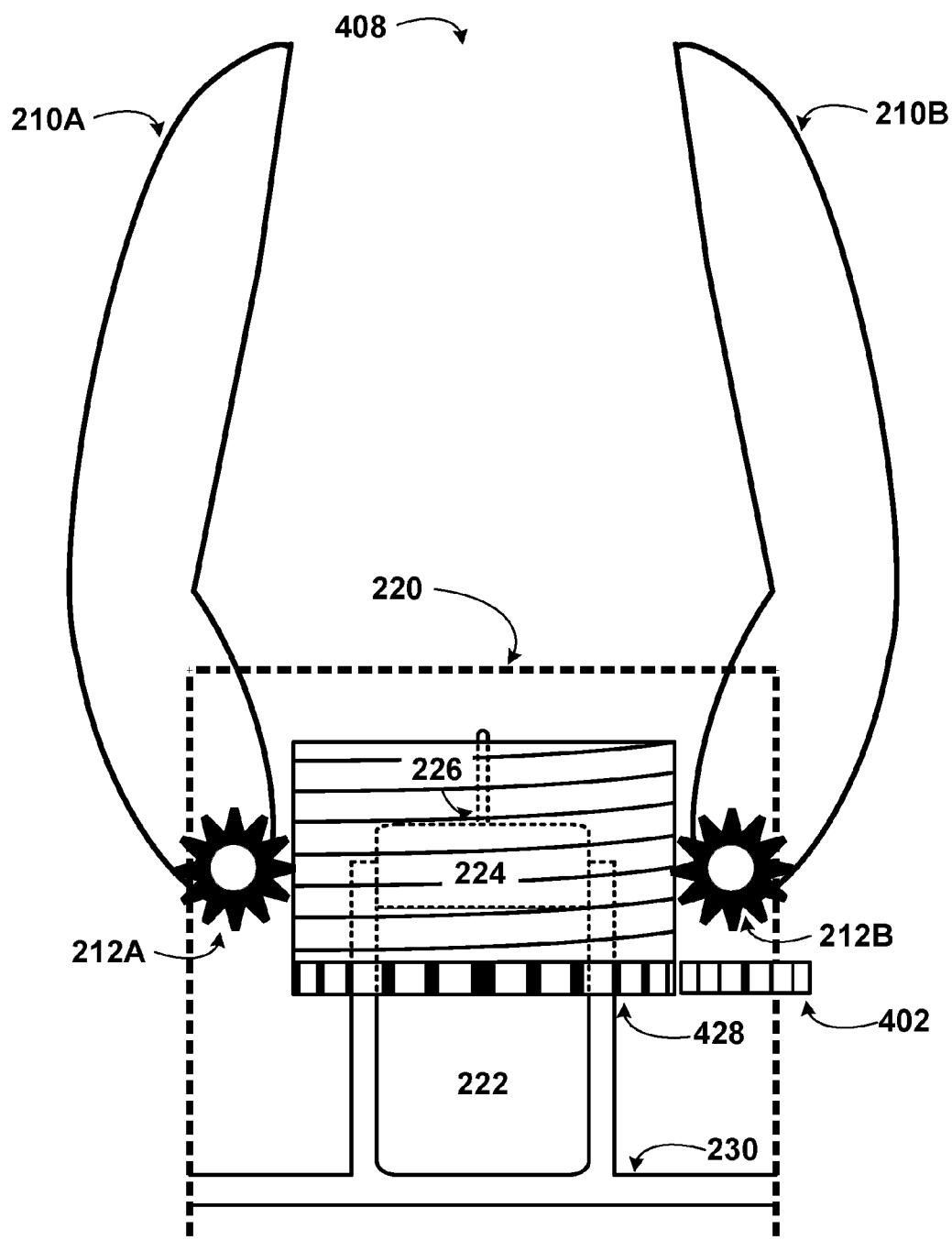
FIG. 4 is a side-view illustration of another robotic gripping apparatus, according to example embodiments.

FIG. 4 is a side-view illustration of another robotic gripping apparatus 408, according to example embodiments. The robotic fingers 210A-B, the spur gears 212A-B, the robotic wrist 220, the motor 222, the gearbox 224, the drive shaft 226, and the mounting bracket 230 are analogous to the corresponding components illustrated in FIG. 2. In addition to the components illustrated in FIG. 2, however, the cylindrical worm gear 428 illustrated in FIG. 4 includes an additional annular spur gear section at the base of the cylindrical worm gear 428. The additional annular spur gear section of the cylindrical worm gear 428 is engaged by a backdriving spur gear 402.

Because the cylindrical worm gear 428 may provide a high torque in the direction of the worm, and the respective axes of rotation of the spur gears 212A-B are perpendicular to the axis of rotation of the cylindrical worm gear 428, it may not be possible to backdrive the cylindrical worm gear 428 by applying an opening force to the robotic fingers 210A-B. Thus, the annular spur gear section of the cylindrical worm gear 428 may be included to allow the cylindrical worm gear 428 to be backdriven. The teeth of the annular spur gear section of the cylindrical worm gear 428 may be spaced in such a way as to be engageable by the backdriving spur gear 402.

The backdriving spur gear 402 may rotate about an axis that is parallel to the axis of rotation of the cylindrical worm gear 428. The backdriving spur gear 402 may provide a requisite amount of mechanical advantage to backdrive the cylindrical worm gear 428. The mechanical advantage may be a consequence of the gearing ratio between the cylindrical worm gear 428 and the backdriving spur gear 402. The gearing ratio may depend on the ratio of the radius of the cylindrical worm gear 428 to the radius of the backdriving spur gear 402. The larger the gearing ratio, the lower the required force at the backdriving spur gear 402 to backdrive the cylindrical worm gear 428. Further, the backdriving spur gear 402 may be disposed partially exterior to the robotic wrist 220 such that it may be accessible from outside of the robotic wrist 220. In some embodiments, this may allow the backdriving spur gear 402 to be thumb-driveable. For example, if the motor 222 loses power (e.g., the control system driving the motor 222 loses power or the power source to the motor 222 is depleted), it may be useful to have a safety mechanism for releasing a grasp around an object formed by the robotic fingers 210A-B. The backdriving spur gear 402 may provide such a capability.

Figure 5:
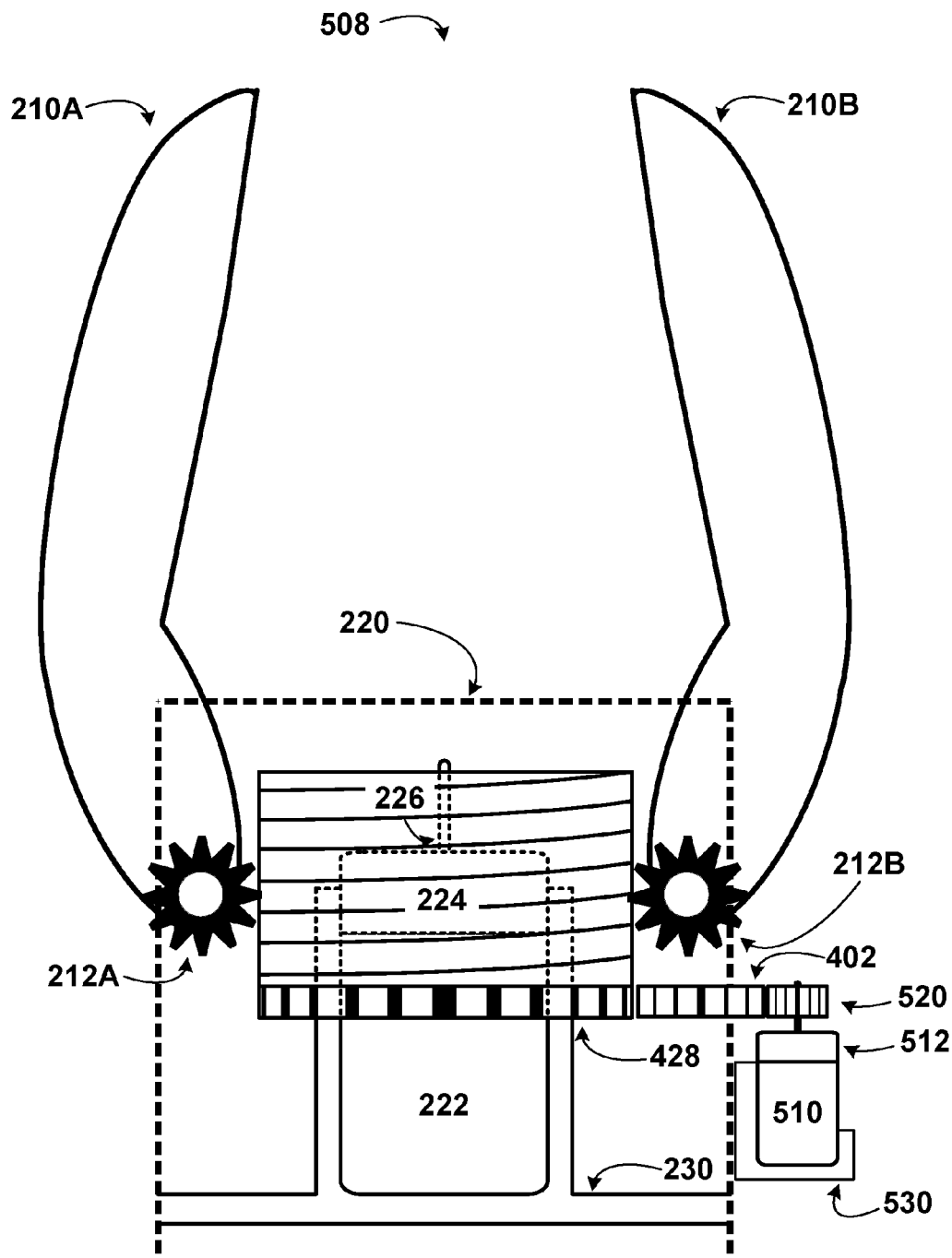
FIG. 5 is a side-view illustration of another robotic gripping apparatus, according to example embodiments.

FIG. 5 is a side-view illustration of another robotic gripping apparatus 508, according to example embodiments. The robotic fingers 210A-B, the spur gears 212A-B, the robotic wrist 220, the motor 222, the gearbox 224, the drive shaft 226, the mounting bracket 230, the cylindrical worm gear 428, and the backdriving spur gear 402 are analogous to the corresponding components illustrated in FIG. 4. In addition to the components illustrated in FIG. 4, however, the backdriving spur gear 402 is engaged by a motorized spur gear 520. The motorized spur gear may be driven by a drive shaft connected to a backdriving motor 510 through a backdriving gear box 512. In some embodiments, the backdriving motor 510 may be mounted to the robotic wrist 220 using a backdriving motor mounting bracket 530.

The backdriving motor 510 may rotate the motorized spur gear 520 through the backdriving gearbox 512 and/or a drive shaft. In some embodiments, the backdriving motor 510 may be powered by a separate power source than the motor 222. Such a configuration may allow the backdriving motor 510 to backdrive the cylindrical worm gear 428 even if power to the motor 222 is lost or a motor controller that controls the motor 222 loses functionality.

In some embodiments, the backdriving gearbox 512 may provide a gear ratio that increases the torque applied by the backdriving motor 510 at a drive shaft to the motorized spur gear 520. Further, the backdriving gearbox 512 may include epicyclic gears. In alternate embodiments, there may be no backdriving gearbox 512 as the gear ratio provided between the backdriving motor 510 and the cylindrical worm gear 428 may already be sufficient to backdrive the cylindrical worm gear 428. In some embodiments, because the backdriving motor 510 is serving to backdrive the robotic fingers 210A-B through a gearing ratio considerably smaller than between the motor 222 and the robotic fingers 210A-B, the backdriving motor 510 may be substantially smaller than the motor 222.

The motorized spur gear 520 may be connected to an end of a drive shaft. The motorized spur gear 520 may engage the backdriving spur gear 402 to drive the backdriving spur gear 402 using the backdriving motor 510. In alternate embodiments, the drive shaft may be tied directly to the backdriving spur gear 402, thus allowing the backdriving motor 510 to drive the backdriving spur gear 402 directly, without the intermediary of the motorized spur gear 520. In still other embodiments, rather than a spur gear, a worm gear may be used to engage the backdriving spur gear 402 with the backdriving motor 510.

The backdriving motor mounting bracket 530 may connect the backdriving motor 510 to an exterior portion of the robotic wrist 220. The backdriving motor mounting bracket 530 may provide stability for the backdriving motor 510 during operation of the backdriving motor 510.

Figure 6:
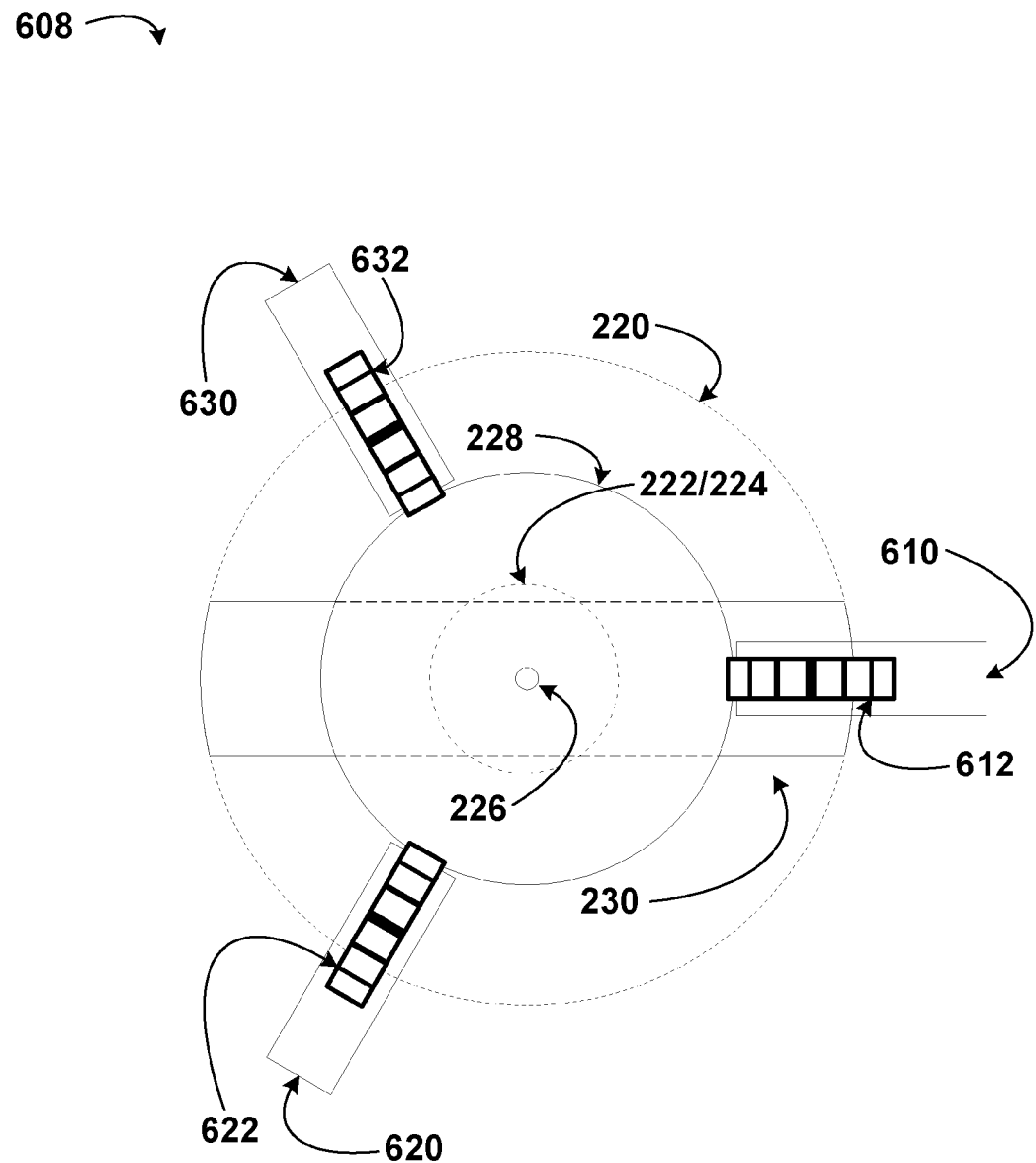
FIG. 6 is a top-view illustration of another robotic gripping apparatus, according to example embodiments.

FIG. 6 is a top-view illustration of another robotic gripping apparatus 608, according to example embodiments. The robotic wrist 220, the motor 222, the gearbox 224, the drive shaft 226, the cylindrical worm gear 228, and the mounting bracket 230 are analogous to the corresponding components illustrated in FIGS. 2 and 3. Unlike the robotic gripping apparatus 208 illustrated in FIGS. 2 and 3, however, the robotic griping apparatus 608 illustrated in FIG. 6 has 3 robotic fingers 610, 620, 630, each with respective spur gears 612, 622, 632. In the embodiment illustrated in FIG. 6, the robotic fingers 610, 620, 630 are spaced evenly about the robotic wrist 220 and the cylindrical worm gear 228 (i.e., each robotic finger is separated from the other two robotic fingers by 120 degrees). The spacing of the robotic fingers 610, 620, 630 about the robotic wrist 220 and the cylindrical worm gear 228, as illustrated in FIG. 6, may allow the robotic gripping apparatus 608 to create an enveloping grasp around objects.

Figure 7:
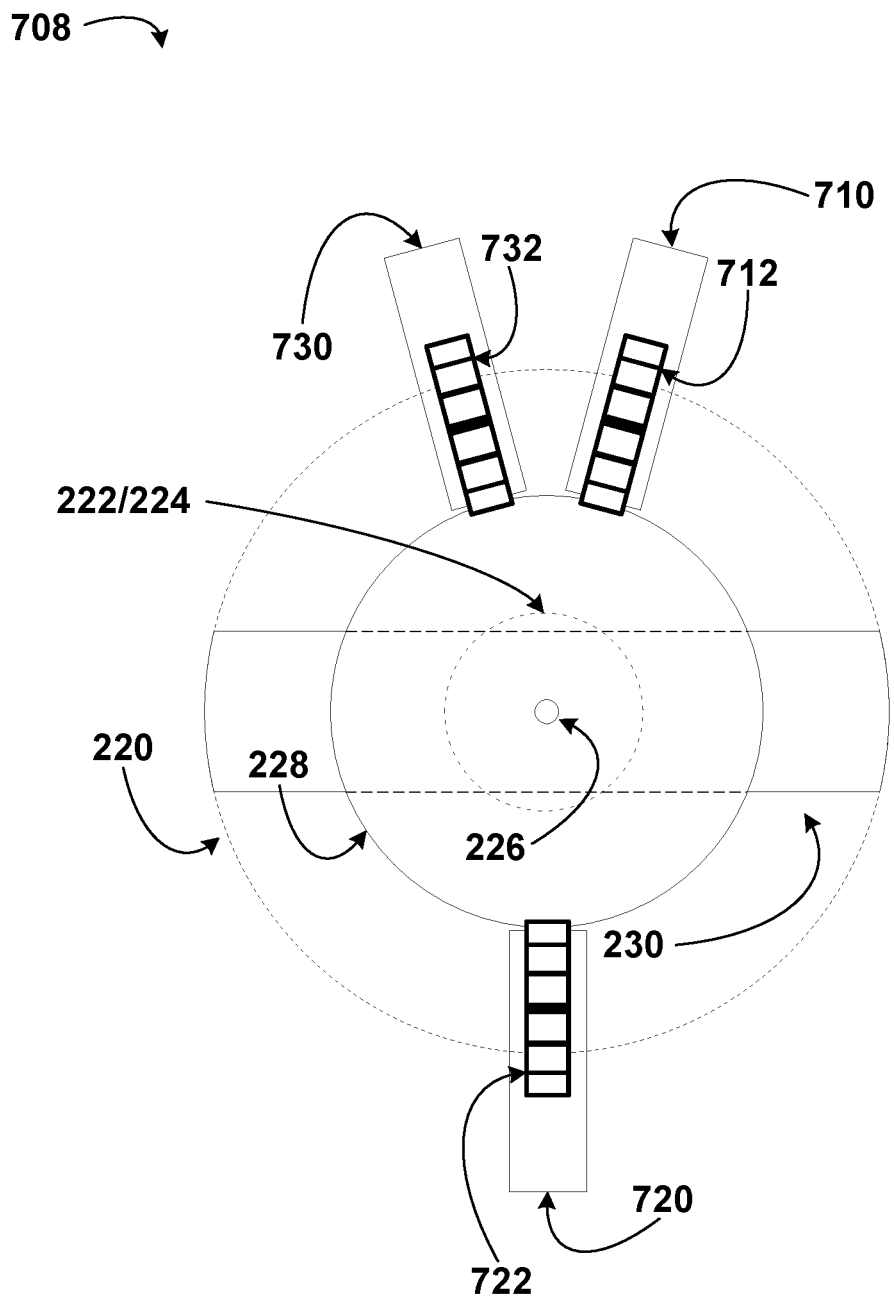
FIG. 7 is a top-view illustration of another robotic gripping apparatus, according to example embodiments.

FIG. 7 is a top-view illustration of another robotic gripping apparatus 708, according to example embodiments. The robotic wrist 220, the motor 222, the gearbox 224, the drive shaft 226, the cylindrical worm gear 228, and the mounting bracket 230 are analogous to the corresponding components illustrated in FIG. 6. Unlike the robotic gripping apparatus 608 illustrated in FIG. 6, however, the robotic fingers 710, 720, 730 of the robotic gripping apparatus 708 illustrated in FIG. 7 are spaced unevenly about the robotic wrist 220 and the cylindrical worm gear 228 (e.g., robotic fingers 710 and 730 are separated from one another by roughly 20 degrees and from robotic finger 720 by roughly 170 degrees). The robotic finger arrangement illustrated in FIG. 7 may allow the robotic gripping apparatus 708 to grasp rod-like objects. In alternate embodiments, the three robotic fingers 710, 720, 730 may be angularly spaced from one another by three unique angles, rather than two congruent angles and a third, non-congruent angle.

FIGS. 8A and 8B are top-view illustrations of another robotic gripping apparatus 808, according to example embodiments. The robotic gripping apparatus 808 illustrated in FIGS. 8A and 8B may have robotic fingers 810, 820, 830 that are repositionable about the robotic wrist 220. The robotic fingers 810, 820, 830 may be attached to the cylindrical worm gear 228 via an attaching means (e.g., a hook or a latch) such that the spur gears 812, 822, 832 engage the cylindrical worm gear 228. In some embodiments, the robotic wrist 220 may further include a ring that, when depressed, disengages the spur gears 812, 822, 832 from the cylindrical worm gear 228. The ring could be depressed, for example, by the robot pressing the robotic wrist 220 against a feature on the base of the robotic wrist 220 that depresses the ring. Upon depressing the ring, the spur gears 812, 822, 832 would be free to be repositioned around the perimeter of the cylindrical worm gear 228. For example, the robot could actuate a robotic arm associated with the robotic gripping apparatus 808 in a particular way using a fixture on a base of the robotic gripping apparatus 808 to reposition the spur gears 812, 822, 832 and the robotic fingers 810, 820, 830. Upon releasing the ring, the spur gears 812, 822, 832 may be reengaged with the cylindrical worm gear 228, allowing the robotic fingers 810, 820, 830 to once again be driven by the motor 222. This process of repositioning the robotic fingers 810, 820, 830 about the circumference of the robotic fingers 810, 820, 830 may transition the robotic gripping apparatus 808 from a first conformation 818, illustrated in FIG. 8A, to a second conformation 828, illustrated in FIG. 8B. This transition between conformations may be indicated by the arrows illustrating the directions of motion for the robotic fingers 810, 820, 830 in FIG. 8A and the dashed arrow in between FIG. 8A and FIG. 8B.

Illustrated in FIG. 8A, the robotic fingers 810, 820, 830 of the robotic gripping apparatus 808 are in the first conformation 818. As an example, if the robotic gripping apparatus 808 were a part of a robotic pitching machine for a baseball, the robotic fingers 810, 820, 830 may be arranged in such a way that the robotic pitching machine may throw a particular type of pitch (e.g., the first conformation 818 illustrated in FIG. 8A may correspond to a fastball).

Illustrated in FIG. 8B, the robotic fingers 810, 820, 830 of the robotic gripping apparatus 808 are in the second conformation 828. As an example, if the robotic gripping apparatus 808 were a part of a robotic pitching machine for a baseball, the robotic fingers 810, 820, 830 may be arranged in such a way that the robotic pitching machine may throw a particular type of pitch (e.g., the second conformation 828 illustrated in FIG. 8B may correspond to a curveball).

In alternate conformations, the robotic gripping apparatus 808 illustrated in FIGS. 8A and 8B could have one robotic finger 830 on one side of the robotic wrist 220 and two robotic fingers 810, 820 on the other side of the robotic wrist 220 (similar to the arrangement of the robotic fingers illustrated in FIG. 7). This could allow the robotic gripping apparatus 808 to create an enveloping grasp around a rod or other similarly shaped objects. In still further conformations, the robotic gripping apparatus 808 could have all three robotic fingers 810, 820, 830 located on the same side of the robotic wrist 220. Such an arrangement could create act as a scoop-style robotic gripping apparatus capable of picking up objects in a shovel-like fashion.

Figure 8C:
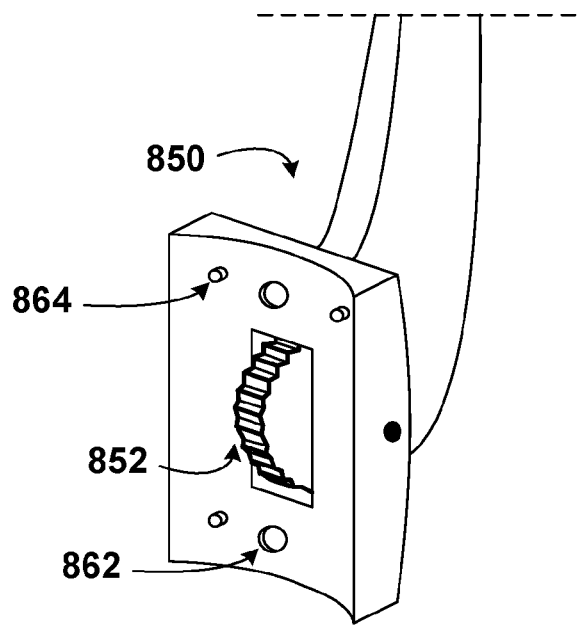
FIG. 8C is an illustration of a repositionable robotic finger, according to example embodiments.
Figure 8D:
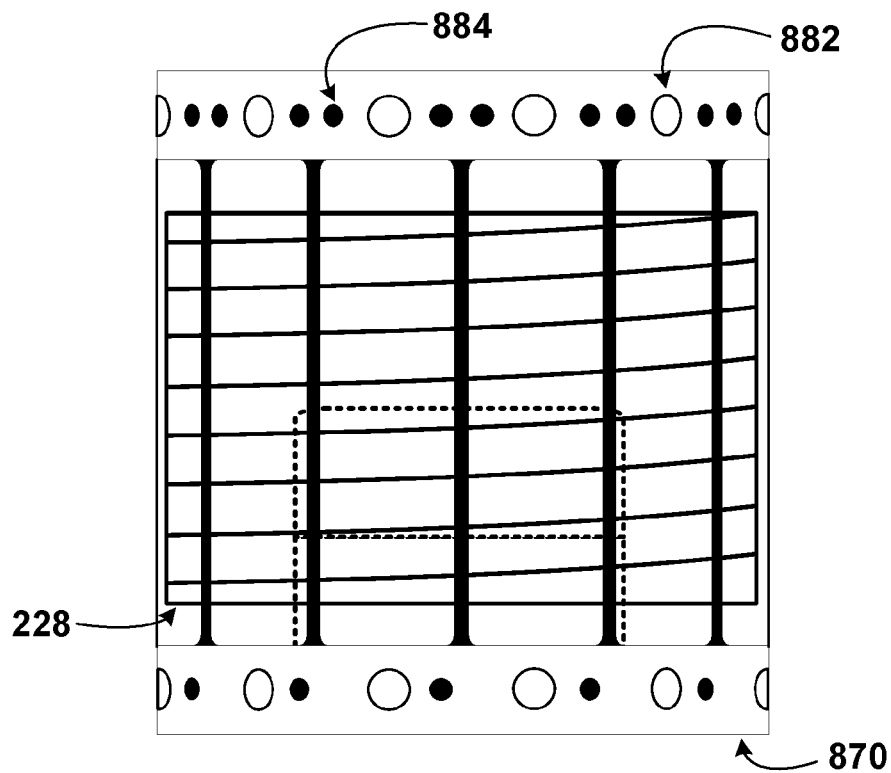
FIG. 8D is a side-view illustration of a robotic wrist of another robotic gripping apparatus, according to example embodiments.

FIG. 8C is an illustration of a repositionable robotic finger 850, according to example embodiments. The repositionable robotic finger 850 has two threaded mounting holes 862, three alignment pins 864, and an associated spur gear 852. The threaded mounting holes 862 may be sized to accommodate screws used to mount the repositionable robotic finger 850 to a robotic wrist (e.g., at discrete mounting points of the robotic wrist as illustrated in FIG. 8D). The screws could be loosened to detach the repositionable robotic finger 850 from the robotic wrist. The repositionable robotic finger 850 could then be repositioned about the robotic wrist and the screws could be reengaged to reattach the repositionable robotic finger 850 to the robotic wrist. The alignment pins 864 may aid in aligning the repositionable robotic finger 850 with discrete mounting points on the robotic wrist. Similarly to previously described embodiments, the spur gear 852 may be driven by a cylindrical worm gear to rotate the repositionable robotic finger 850. This may be done, for example, to grip objects using a robotic gripping apparatus.

In alternate embodiments, a plate on which the alignment pins are located and in which the threaded mounting holes are located may ride in a channel that is located around the circumference of a robotic wrist. The plate may be flexible, allowing the plate to be bent, and thus removed from the channel. Further, the flexible plate may, when released, snap tautly into place. Additionally, the robotic wrist could include detents used to hold the plate, and therefore the repositionable robotic finger, in place at defined locations.

FIG. 8D is an illustration of a robotic wrist 870 for use with the repositionable robotic finger 850 of FIG. 8C. The robotic wrist 870 may house the cylindrical worm gear 228 as described previously. Additionally, the robotic wrist 870 may house a motor, a gearbox, or a drive shaft, as described previously. As indicated, the robotic wrist may have discrete mounting locations for the repositionable robotic finger 850. Each discrete mounting location may include threaded mounting holes 882 for connecting the robotic wrist 870 to the threaded mounting holes 862 of the repositionable robotic finger 850 (e.g., using a screw). The robotic wrist 870 may also have alignment recesses 884 in which the alignment pins 864 of the repositionable robotic finger 850 can be inserted to align the repositionable robotic finger 850 with the discrete mounting location.

Figure 9:
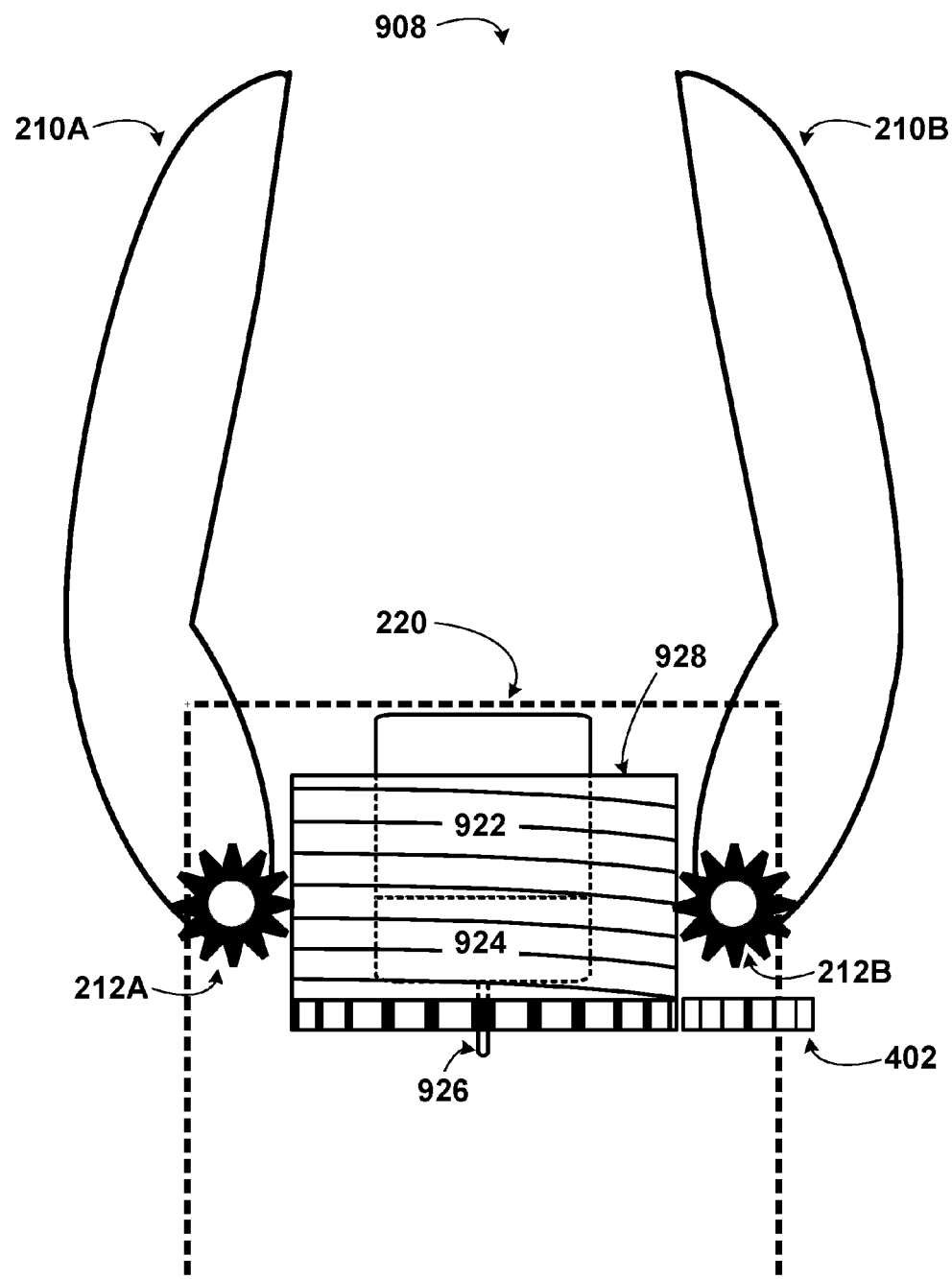
FIG. 9 is a side-view illustration of another robotic gripping apparatus, according to example embodiments.

FIG. 9 is a side-view illustration of another robotic gripping apparatus 908, according to example embodiments. The robotic fingers 210A-B, the spur gears 212A-B, the robotic wrist 220, and the backdriving spur gear 402 are analogous to the corresponding components illustrated in FIG. 4. Unlike the robotic gripping apparatus 408 illustrated in FIG. 4, however, the motor 922 of FIG. 9, as well as the gearbox 924 and the drive shaft 926, are inverted relative to the robotic wrist 220 and the robotic fingers 210A-B. Furthermore, the cylindrical worm gear 928 may have an open end on the side of the cylindrical worm gear 928 nearest to the end of the robotic wrist 220 (i.e., the top side of the cylindrical worm gear 928), rather than having an open end on the side of the of the cylindrical worm gear 928 nearest to the annular spur gear section of the cylindrical worm gear 928 (i.e., the bottom side of the cylindrical worm gear 928). The robotic gripping apparatus 908 illustrated in FIG. 9 may provide for an easier mounting of the motor 922 within the robotic wrist 220 than the example embodiment of the robotic gripping apparatus 408 illustrated in FIG. 4. This may be due to the fact that the motor 922 may be directly mounted to an end of the robotic wrist 220 rather than requiring an additional mounting bracket, as illustrated in FIG. 4.

In some embodiments, the robotic fingers 210A-B may be removed from the robotic wrist 220 and replaced with other tools. These alternative tools may engage the cylindrical worm gear 228 to be driven by the motor 222. Two such examples are presented in FIGS. 10A and 10B.

Figure 10A:
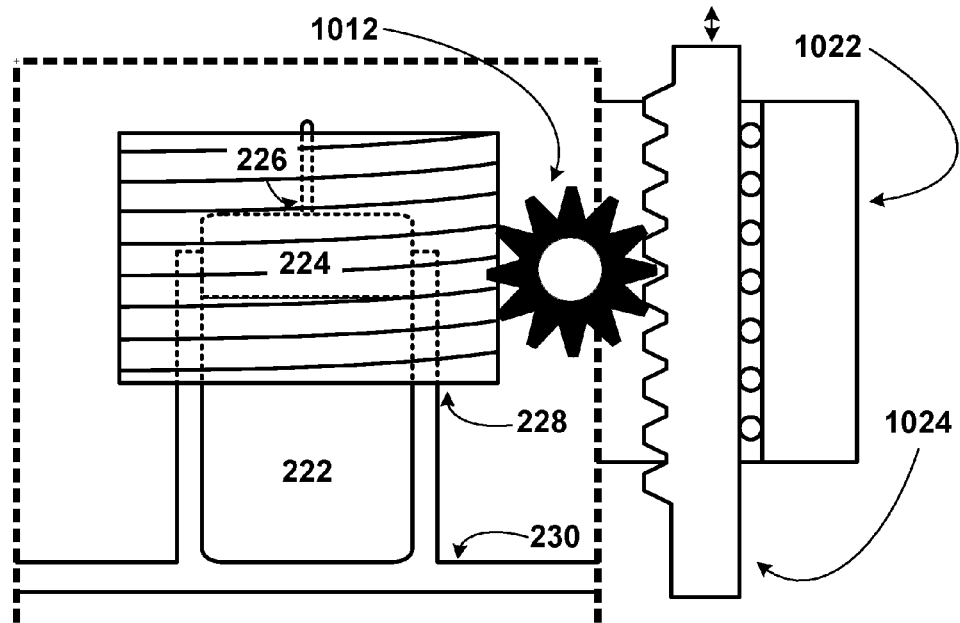
FIG. 10A is a side-view of another robotic wrist, according to example embodiments.

FIG. 10A is side-view illustration of another robotic wrist equipped with a linear motor actuator. The robotic wrist has components analogous to those illustrated in FIG. 2. Rather than robotic fingers 210A-B, however, the spur gear 1012 (i.e., pinion) engages a rack 1024. The rack 1024 is housed against a backstop in a linear actuator housing 1022. Thus, when the spur gear 1012 is driven by the motor 222 and the cylindrical worm gear 228, the rack 1024 translates up or down, vertically. This could be used as a linear actuation mechanism.

Figure 10B:
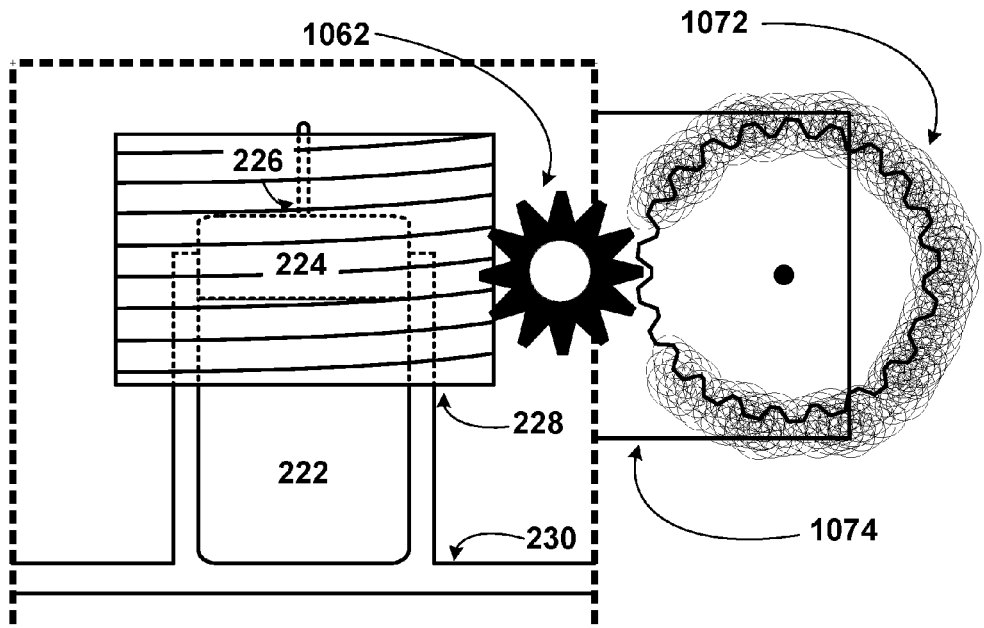
FIG. 10B is a side-view of another robotic wrist, according to example embodiments.

FIG. 10B is a side-view illustration of another robotic wrist equipped with a rotating cleaning head 1072. The robotic wrist has components analogous to those illustrated in FIG. 2. Rather than robotic fingers 210A-B, however, the spur gear 1062 engages the rotating cleaning head 1072. The rotating cleaning head 1072 may be mounted to a cleaning housing 1074, for example. The spur gear portion of the rotating cleaning head 1072 illustrated in FIG. 10B may represent a center portion of the rotating cleaning head that wraps around the entire circumference of the rotating cleaning head 1072 at the center. The rest of the cleaning head may be covered in cleaning fabric, for example, around the entire circumference of the rotating cleaning head 1072.

Other tool attachments for the cylindrical worm gear 228 and robotic wrist are possible. For example, sensor (e.g., a laser scanner) that requires rotary actuation may be affixed to the robotic wrist and driven by the cylindrical worm gear 228.

Figure 11:
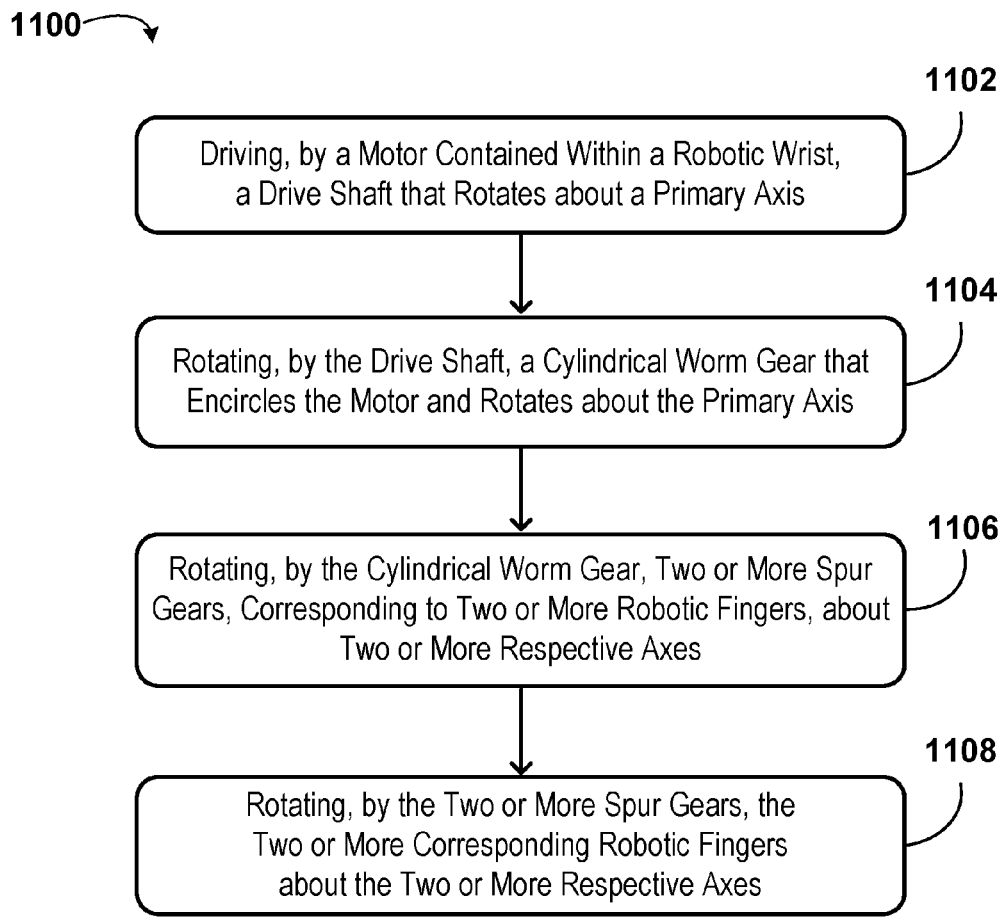
FIG. 11 is a flowchart diagram of a method, according to example embodiments.

FIG. 11 is a flowchart diagram of a method 1100, according to example embodiments. The method 1100 may be used to grasp objects in an environment using robotic fingers of a robotic gripper, such as the robotic fingers 210A-B of the robotic gripping apparatus 208 illustrated in FIG. 2.

At block 1102, the method 1100 includes driving, by a motor contained within a robotic wrist, a drive shaft that rotates about the primary axis. Block 1102 may further include applying a voltage, such as a DC voltage, across two terminals of the motor, such that the motor is engaged (e.g., a rotor of the motor begins rotating amid the electromagnetic fields established between the rotor and one or more stators, and the motor rotor is rotationally tied to the drive shaft). Block 1102 may occur, in some embodiments, in response to a signal sent by a motor controller. For example, the motor controller may engage the motor in response to a command initiated by a processing unit of a control system that executes instructions to control the robotic gripping apparatus. Additionally or alternatively, the motor may be engaged by the motor controller in response to a wireless or wired transmission received from a remote control of a user.

At block 1104, the method 1100 includes rotating, by the drive shaft, a cylindrical worm gear that encircles the motor and rotates about the primary axis. The drive shaft may be directly connected to the cylindrical worm gear, as illustrated in FIG. 2. Alternatively, block 1104 may include the rotation of additional gears and/or belts that rotationally connect the drive shaft with the cylindrical worm gear.

At block 1106, the method 1100 includes rotating, by the cylindrical worm gear, two or more spur gears, corresponding to two or more robotic fingers, about two or more respective axes. Each of the robotic fingers may have a proximal end and a distal end. Further, the proximal end of each of the robotic fingers may be connected to the robotic wrist, and each spur gear may be attached to the proximal end of the corresponding robotic finger.

When the spur gears rotate, they may rotate in opposing directions (e.g., clockwise vs. counterclockwise) about their respective axes, when viewed from the side. In alternate embodiments, one or more of the spur gears may have one or more additional gears placed between the respective spur gear at the cylindrical worm gear, thereby changing the direction of rotation of the respective spur gear.

Furthermore, block 1106 may include the spur gears rotating until a certain stop point is reached. For example, the spur gears may include a mechanical stop which prevents the spur gears from rotating past a certain angle. Such a mechanical stop may prevent the corresponding robotic fingers from opening a robotic grasp too widely or closing a robotic grasp too narrowly.

At block 1108, the method 1100 includes rotating, by the two or more spur gears, the two or more corresponding robotic fingers about the two or more respective axes. Block 1108 may include closing or opening a grasp of a robotic gripping apparatus, by closing or opening the robotic fingers with respect to one another.

Alternatively, block 1108 may include repositioning the robotic fingers with respect to the robotic wrist. For example, there may be an additional spur gear between the left spur gear and the cylindrical worm gear. This may allow the left robotic finger to rotate in the same direction (e.g., clockwise vs. counterclockwise) as the right robotic finger when the cylindrical worm gear rotates. Thus, when the cylindrical worm gear rotates, the grasp of the robotic gripping apparatus would not be widened or narrowed, but rather, the entire grasp may be rotated with respect to the robotic wrist. In some embodiments, such an additional spur gear may be clutched, thus allowing a switching of the direction of rotation of the robotic fingers. This could allow a robotic gripping apparatus to go from a squeeze motion to a roll motion. Such a functionality could enable the respective robotic gripping apparatus to be used in a variety of applications (e.g., grasping a wet sponge and then rotating the grasp, which in turn creates relative motion between tips of the robotic fingers due to misaligned axes of rotation, to wring out the sponge).

Figure 12:
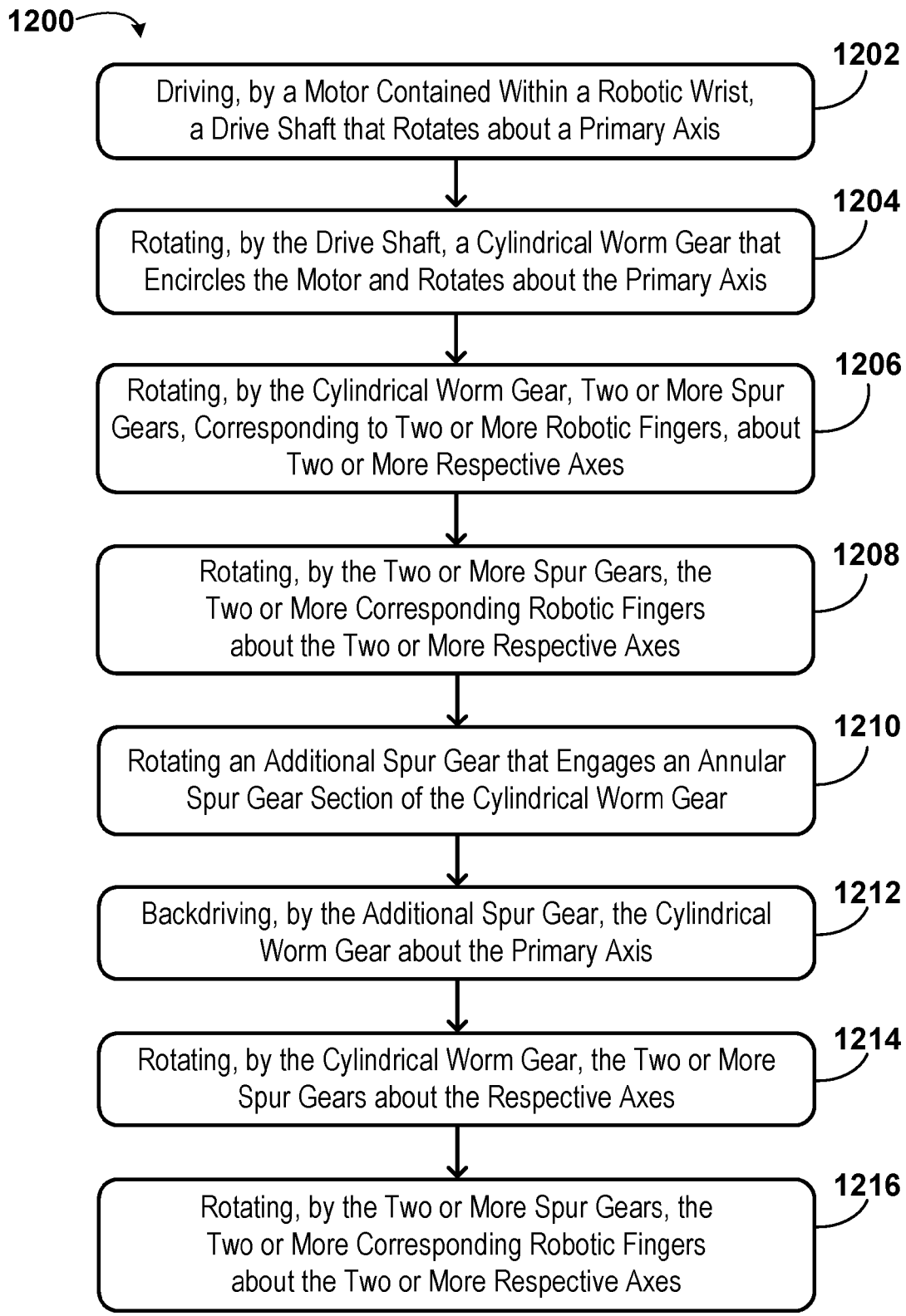
FIG. 12 is a flowchart diagram of another method, according to example embodiments.

FIG. 12 is a flowchart diagram of another method 1200, according to example embodiments. The method 1200 may be used to grasp objects in an environment using robotic fingers of a robotic gripper, such as the robotic fingers 210A-B of the robotic gripping apparatus 408 illustrated in FIG. 4. Further, the method 1200 may be used to backdrive the robotic fingers 210A-B of a robotic gripper 408 to release objects grasped by the robotic fingers 210A-B.

In some embodiments, blocks 1202 through 1208, may be performed analogously to blocks 1102 through 1108 of method 1100 illustrated in FIG. 11 (see FIG. 11 and accompanying description for more information regarding blocks 1102 through 1108 of method 1100).

At block 1202, the method 1200 includes driving, by a motor contained within a robotic wrist, a drive shaft that rotates about a primary axis.

At block 1204, the method 1200 includes rotating, by the drive shaft, a cylindrical worm gear that encircles the motor and rotates about the primary axis.

At block 1206, the method 1200 includes rotating, by the cylindrical worm gear, two or more spur gears, corresponding to two or more robotic fingers, about two or more respective axes. Each of the robotic fingers may have a proximal end and a distal end. Further, the proximal end of each of the robotic fingers may be connected to the robotic wrist, and each spur gear may be attached to the proximal end of the corresponding robotic finger.

At block 1208, the method 1200 includes rotating, by the two or more spur gears, the two or more corresponding robotic fingers, about the two or more respective axes.

At block 1210, the method 1200 includes rotating an additional spur gear that engages an annular spur gear section of the cylindrical worm gear.

Block 1210 may include rotationally driving the additional spur gear. The additional spur gear may be thumb-driven in some embodiments. Alternatively, the additional spur gear may be engaged by a backdriving motor and/or an additional motorized spur gear. In this manner, when the backdriving motor is engaged, the motorized spur gear may be rotated, thereby rotating the backdriving spur gear.

At block 1212, the method 1200 includes backdriving, by the additional spur gear, the cylindrical worm gear about the primary axis. Block 1212 may include generating some amount of energy to be stored within an energy storage device (e.g., a battery) within the robotic gripping apparatus. Because the cylindrical worm gear is being backdriven, and a motor is connected to the cylindrical worm gear, a back emf (electromotive force) may be generated across the terminals of the motor (i.e., the motor may act like a generator). This back emf may create an electric field around a closed-loop circuit, and thereby induce a current within the circuit. This current, for example, may build up charge on a capacitor or in a battery, thereby storing energy.

At block 1214, the method 1200 includes rotating, by the cylindrical worm gear, the two or more spur gears about the respective axes. The two or more spur gears may rotate in a reverse direction of the direction the two or more spur gears rotate during block 1206. The cylindrical worm gear may engage the two or more spur gears directly. This may occur through the worm gear section (as opposed to the annular spur gear section) of the cylindrical worm gear. Alternatively, the cylindrical worm gear may be coupled to the spur gears through one or more intervening gears. The amount of mechanical advantage generated at the teeth of the cylindrical worm gear may be substantial (i.e., the gear ratio is large), such that a relatively small amount of torque applied to the additional spur gear may translate to a relatively large amount of torque acting on the spur gears.

At block 1216, the method 1200 includes rotating, by the two or more spur gears, the two or more corresponding robotic fingers about the two or more respective axes. The two or more corresponding robotic fingers may rotate in a reverse direction of the direction the two or more robotic fingers rotate during block 1208. The two or more spur gears may be connected to the robotic fingers. Thus, when the two or more spur gears rotate, the robotic fingers either close or open a grasp formed, collectively, by the robotic fingers of the robotic gripping apparatus. Block 1216 may allow the release of an object due to the backdriving occurring in blocks 1210 through 1216. Further, this may occur without power to the motor (e.g., the robotic fingers release an object by being backdriven, directly or through a series of geared connections, by thumb-driving the backdriving spur gear).

In some embodiments of method 1200, blocks 1202 through 1208 may not be performed. For example, if a robotic gripping apparatus has no electrical power supplied to the motor, or even no motor at all, the additional spur gear may still be rotated to correspondingly rotate the two or more robotic fingers, as described in blocks 1210 through 1216 of method 1200.

III. Conclusion

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the Figures, similar symbols typically identify similar components, unless context dictates otherwise. The example embodiments described herein and in the Figures are not meant to be limiting. Other embodiments can be utilized, and other changes can be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The particular arrangements shown in the Figures should not be viewed as limiting. It should be understood that other embodiments can include more or less of each element shown in a given Figure. Further, some of the illustrated elements can be combined or omitted. Yet further, an example embodiment can include elements that are not illustrated in the Figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A robotic apparatus, comprising:
a robotic wrist;
a motor contained within the robotic wrist, wherein the motor comprises a drive shaft that is configured to rotate about a primary axis during motor operation;
a cylindrical worm gear, connected to the drive shaft, wherein the cylindrical worm gear encircles the motor and is configured to rotate about the primary axis during motor operation; and
a spur gear that engages a rotating cleaning head at a spur gear portion of the rotating cleaning head, wherein the spur gear also engages the cylindrical worm gear and is configured to rotate the rotating cleaning head about a respective axis when the cylindrical worm gear rotates about the primary axis.

2. The robotic apparatus of claim 1, wherein the cylindrical worm gear comprises an annular spur gear section that encircles the motor and is configured to rotate about the primary axis during motor operation, and wherein the robotic apparatus comprises an additional spur gear that engages the annular spur gear section of the cylindrical worm gear and is configured to backdrive the cylindrical worm gear from outside of the robotic wrist.

3. The robotic apparatus of claim 2, further comprising an additional motor having a drive shaft connected to the additional spur gear, wherein the additional motor is configured to rotate the additional spur gear.

4. The robotic apparatus of claim 1, wherein the cylindrical worm gear is connected to the drive shaft of the motor through a gear box.

5. The robotic apparatus of claim 1, further comprising a mounting bracket mounted to a side of the motor opposite the drive shaft that secures the motor to the robotic wrist.

6. The robotic apparatus of claim 5, wherein at least a portion of the mounting bracket is fastened to the motor between the motor and the cylindrical worm gear.

7. The robotic apparatus of claim 1, wherein the cylindrical worm gear comprises an open end and a closed end, and wherein the open end is disposed nearer to a distal end of the robotic wrist than the closed end.

8. The robotic apparatus of claim 1, wherein the cylindrical worm gear comprises an open end and a closed end, and wherein the closed end is disposed nearer to a distal end of the robotic wrist than the open end.

9. The robotic apparatus of claim 1, wherein the rotating cleaning head is mounted to a cleaning housing.

10. The robotic apparatus of claim 1, wherein the spur gear portion of the rotating cleaning head wraps around an entire circumference of the rotating cleaning head at a center portion of the rotating cleaning head.

11. The robotic apparatus of claim 1, wherein portions of the rotating cleaning head other than the spur gear portion are covered in cleaning fabric around an entire circumference of the rotating cleaning head.

12. A method, comprising:
driving, by a motor contained within a robotic wrist, a drive shaft that rotates about a primary axis;
rotating, by the drive shaft, a cylindrical worm gear, wherein the cylindrical worm gear encircles the motor and rotates about the primary axis;
rotating, by the cylindrical worm gear, a spur gear; and
rotating, by the spur gear, a rotating cleaning head, about a respective axis, at a spur gear portion of the rotating cleaning head.

13. The method of claim 12, further comprising:
rotating an additional spur gear that engages an annular spur gear section of the cylindrical worm gear, wherein the annular spur gear section of the cylindrical worm gear encircles the motor and rotates about the primary axis, and wherein at least a portion of the additional spur gear is disposed outside of the robotic wrist; and
backdriving, by the additional spur gear, the cylindrical worm gear about the primary axis.

14. The method of claim 13, wherein rotating the additional spur gear that engages the annular spur gear section of the cylindrical worm gear is performed by an additional motor having a drive shaft connected to the additional spur gear.

15. A robot comprising:
a robotic wrist;
a motor contained within the robotic wrist, wherein the motor comprises a drive shaft that is configured to rotate about a primary axis during motor operation;
a cylindrical worm gear, connected to the drive shaft, wherein the cylindrical worm gear encircles the motor and is configured to rotate about the primary axis during motor operation; and
a spur gear that engages a rotating cleaning head at a spur gear portion of the rotating cleaning head, wherein the spur gear also engages the cylindrical worm gear and is configured to rotate the rotating cleaning head about a respective axis when the cylindrical worm gear rotates about the primary axis.

16. The robot of claim 15, wherein the cylindrical worm gear comprises an annular spur gear section that encircles the motor and is configured to rotate about the primary axis during motor operation, and wherein the robot comprises an additional spur gear that engages the annular spur gear section of the cylindrical worm gear and is configured to backdrive the cylindrical worm gear from outside of the robotic wrist.

17. The robot of claim 16, further comprising an additional motor having a drive shaft connected to the additional spur gear, wherein the additional motor is configured to rotate the additional spur gear.

18. The robot of claim 15, wherein the cylindrical worm gear is connected to the drive shaft of the motor through a gear box.

19. The robot of claim 15, further comprising a mounting bracket mounted to a side of the motor opposite the drive shaft that secures the motor to the robotic wrist.

20. The robot of claim 19, wherein at least a portion of the mounting bracket is fastened to the motor between the motor and the cylindrical worm gear.

* * * * *